(12) United States Patent
Okon et al.

(10) Patent No.: US 6,504,920 B1
(45) Date of Patent: Jan. 7, 2003

(54) METHOD AND SYSTEM FOR INITIATING CONVERSATIONS BETWEEN CALLERS HAVING COMMON INTERESTS

(76) Inventors: Shmuel Okon, 36 Hanadiv St., Herzeliya (IL), 46485; Reuven Tal, 111 Zahal St., Kiron (IL), 55451

( * ) Notice: Subject to any disclaimer, the term of this patent is extended or adjusted under 35 U.S.C. 154(b) by 65 days.

(21) Appl. No.: 09/594,835

(22) Filed: Jun. 15, 2000

Related U.S. Application Data

(60) Provisional application No. 60/140,035, filed on Jun. 18, 1979.

(51) Int. Cl.[7] .............................................. H04M 15/00
(52) U.S. Cl. ............. 379/121.01; 379/111; 379/114.05; 379/115.02
(58) Field of Search ........................ 379/114.01, 114.05, 379/114.12, 115.02, 121.02, 142.01, 142.06, 201.01, 201.02, 201.07, 201.08, 201.11, 202, 121.01, 111

(56) References Cited

U.S. PATENT DOCUMENTS

| | | | | |
|---|---|---|---|---|
| 5,086,394 A | * | 2/1992 | Shapira | 364/419 |
| 5,146,491 A | * | 9/1992 | Silver et al. | 379/114 |
| 5,651,058 A | * | 7/1997 | Hackett-Jones et al. | 379/201 |
| 5,818,836 A | * | 10/1998 | DuVal | 370/389 |
| 5,884,272 A | * | 3/1999 | Walker et al. | 705/1 |
| 5,907,677 A | * | 5/1999 | Glenn et al. | 395/200.36 |
| 5,978,467 A | | 11/1999 | Walker et al. | 379/266 |
| 6,148,067 A | * | 11/2000 | Leipow | 379/201 |
| 6,175,619 B1 | * | 1/2001 | DeSimone | 379/202 |
| 6,223,165 B1 | * | 4/2001 | Lauffer | 705/8 |
| 6,272,214 B1 | * | 8/2001 | Jonsson | 379/202 |
| 6,314,178 B1 | * | 11/2001 | Walker et al. | 379/266.01 |
| 6,337,858 B1 | * | 1/2002 | Petty et al. | 370/356 |

FOREIGN PATENT DOCUMENTS

| | | | | |
|---|---|---|---|---|
| WO | WO 01/30057 A2 | * | 4/2001 | H04M/3/00 |
| WO | WO 01/31903 A1 | * | 5/2001 | H04M/3/56 |

\* cited by examiner

*Primary Examiner*—Binh Tieu
(74) *Attorney, Agent, or Firm*—Darby & Darby

(57) ABSTRACT

A system for initiating conversations between callers to a telephone receives calls from various callers, receives selections of various topics of conversation from the callers, and then establishes communication links between pairs of callers in accordance with the selected topics. In a given conversation, at least a portion of the call is billed at a special rate or provided at no cost. After a predetermined period of time has elapsed, the call is billed at a second rate unless terminated by at least one of the parties. A partner history can be maintained and used by the system to ensure that previously partnered callers are not paired up again for at least a specified time span.

37 Claims, 3 Drawing Sheets

METHOD AND SYSTEM FOR INITIATING CONVERSATIONS BETWEEN CALLERS HAVING COMMON INTERESTS

STATEMENT OF RELATED APPLICATION:

This application claims priority from U.S. Provisional Application 60/140,035 filed on Jun. 18, 1999 and entitled "Phone-Mate Service", the entire contents of which are expressly incorporated herein.

FIELD OF THE INVENTION:

The present invention is related to a method and system for initiating conversations between callers to a telephone service by matching callers to each other according to expressed interests and establishing a communication link between the matched callers.

BACKGROUND OF THE INVENTION

Many people have a desire to talk with other people about topics of interest. Often, these people also desire to meet new people to converse with. One popular way to meet this need is through Internet-based chat services. These services allow a user connected to the Internet to enter virtual "chat rooms" dedicated to general or specific topics and engage in conversations with others in the same room.

Although Internet-chat systems are increasingly popular, they have several limitations. First, the systems are available only to those who have Internet-access and then, only when the users are at their computer. This prevents conversational needs from being met for an individual who is not at a computer or has poor computer skills. Another disadvantage is that Internet chat services are generally text-based, not vocal, and thus are more cumbersome to use than more conventional communication means, such as telephones. Internet-chat services of this type can thus be used only in limited circumstances and only by users with suitable computer equipment.

Unlike Internet-chat, basic telephone service is available almost universally and the wide availability of cellular telephone systems makes it possible for individuals to engage in conversations almost anywhere and at any time.

It is therefore an object of the present invention to provide a method and system to initiate conversations between parties using readily available telephone technology and without the limitations of text-based Internet chat-room environments.

It is a further object of the present invention to provide a telephonic-based system which allows callers to converse with others having common interest and also encourages future calls between those parties to increase system usage and therefore revenue.

SUMMARY OF THE INVENTION

These and other objectives are achieved by a method and system of the invention in which conversations are initiated between callers to a telephone service by matching callers to each other according to expressed interests. According to the method, when a call is received by the communication system, the calling party is asked to select from a menu of one or more topics of conversation. A list of prior callers is then accessed and the new caller is partnered with one of the prior callers having at least one of the selected topics in common. A telephonic or other communication link is then established between the new caller and the partner.

According to one aspect of the invention, at least a portion of the established call is billed at a first rate, such as a reduced rate or free. After a predetermined period of time has elapsed, one or both of the parties are billed at a second rate, such as a normal billing rate, unless the call is terminated. To prevent the same pair of callers from repeatedly being connected by the system, a partner history is maintained and the system ensures that previously partnered callers are not paired up again for at least a specified time span. As a result, a party can terminate a conversation with a partner they do not like and not be immediately paired up with the same partner. This feature also makes it difficult for partners to exploit the limited availability of the first billing rate period by repeatedly accessing the system and selecting obscure topics in an effort to be re-partnered with other.

Advantageously, this system matches partners who otherwise might not ever talk to each other and thereby increases the usage of the system from the first conversation after partners switch to the second rate and in subsequent regular telephone conversations which result from the newly developed acquaintances. In addition, the system preferably does not release information about callers to their partners. Thus, partners remain anonymous to each other unless they affirmatively decide to exchange personal information during the conversation.

A system implementing this method can be easily integrated within a telephone system using conventional techniques. In one implementation, a central switching system implementing the method is connected to the telephone network and assigned a designated telephone number. Users calling the designated system number are connected to the switching system which then holds and connects the various lines in accordance with the method using standard computer and telephone network equipment known to those of skill in the art. Alternatively, the system can be implemented by a third party connected to the telephone network.

As can be appreciated, the present invention benefits users of the system by providing a way for them to get acquainted with people having common fields of interest. The system is particularly useful for cellular telephone users since it provides a way for those with time to fill during long journeys to entertain themselves by engaging in informative and/or entertaining talks. This type of outlet also can be used by individuals driving long distances by themselves to keep alert and provide a source of entertainment.

Telephone service providers also benefit from using the present invention because it provides a potentially revenue generating use for resources otherwise not in use, e.g., in non-saturated areas and at off-peak times. An additional benefit for service providers is that people who get acquainted using the invention will in most cases talk to each other again in the future using regular service, thus increasing overall telephone system usage.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
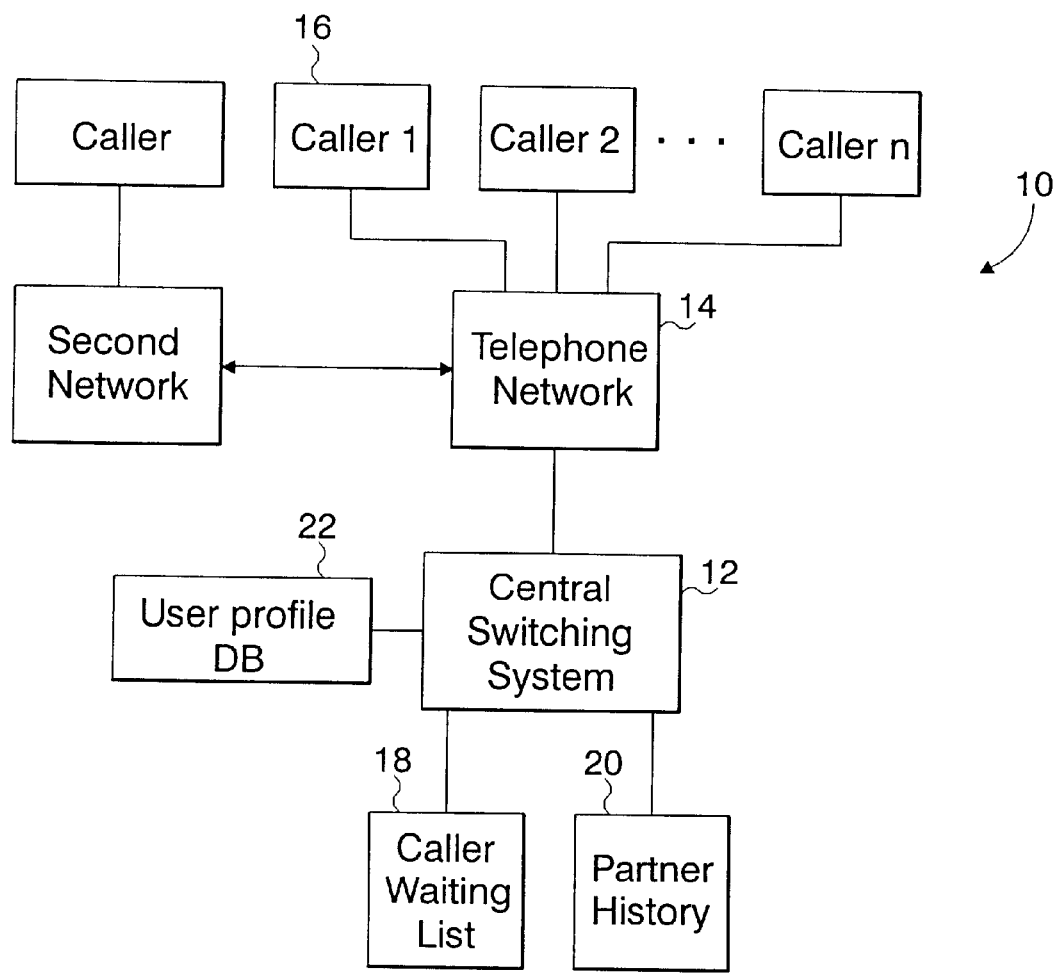
FIG. 1 is a block diagram of a system for implementing the present invention.

Turning to FIG. 1, there is shown a system 10 for automatically matching pairs of callers to establish telephone conversations on subjects of common interest or other predefined criteria. The system 10 includes a central switching system 12 which is connected to a communications network 14, such as a telephone network, and thereby to a plurality of callers 16. The central switching system 12 can be assigned one or more specific access numbers, such as a toll-free "800" number or a specialized "*" number. System 12 is controlled by a computer system which is programmed to implement the method discussed below to pair various callers with each other. The system 12 includes data storage equipment, such as RAM or a data disk, suitable for maintaining a waiting list 18 of prior callers waiting to be paired with another caller.

A partner history 20 can also be provided in which a record of which callers have been previously paired with each other is maintained. Various identifiers can be used to identify callers within the partner history, including an explicit ID entered by the caller, such as a credit card number or an assigned user identifier. Alternatively, or in addition, caller-ID information indicating the number from which a call has been placed can also be used to identify specific callers.

In one embodiment, the central switching system 12 is implemented within the infrastructure of one or more communication providers. In a telephone system, the telephone number (e.g., caller-ID) associated with caller is readily available and can be used as a caller identifier to simplify generating and maintaining a record of callers and who they have been subsequently paired with. The number can also be used to access a user profile database 22 which may contain internally generated information to track system usage as well as preferences specified by the user.

Alternatively, the switching system 12 can be implemented externally to the network 14. However, in this embodiment, it may be more difficult to determine information about the calling parties, such as their telephone number, because services like caller-ID can be blocked by the caller. In such situations, a user may be asked to enter an assigned ID when calling the system.

The switching system 12 can be implemented using conventional telephonic computing and switching hardware and standard programming techniques. These systems and techniques are well known to those of skill in the art and the particular implementation utilized is not critical to the operation of the invention.

In general, the central switching system 12 is programmed to receive calls to the service from various callers and also receive a selection of at least one topic of interest from the caller. The topic selection can be made by the caller after they connect to the system or can be previously specified in a user profile. The system then associates the new caller with a prior caller in accordance with the new callers selected topic and initiates a communication link, which is preferably a telephonic voice link, between the paired callers. If no prior caller in the caller waiting list can be associated with the new caller, the new caller can be added to a waiting list or prompted to select a different topic.

According to a further aspect of the invention, once a communication link is established between a pair of callers, the system bills one or both of the callers at a first billing rate, such as a reduced rate or even free, for a limited conversation time. After that period of time has elapsed, the callers can continue the conversation at a second rate, such as a standard billing rate, or terminate the call. To prevent callers from selecting obscure topics in the hopes of repeatedly being paired with each other, and thereby continuing a conversation at the reduced rate, and also to prevent a party terminating a conversation from being immediately re-partnered with the same individual, the system preferably prevents a pair of callers from being subsequently paired with each other for at least a minimum time span.

Figure 2A:
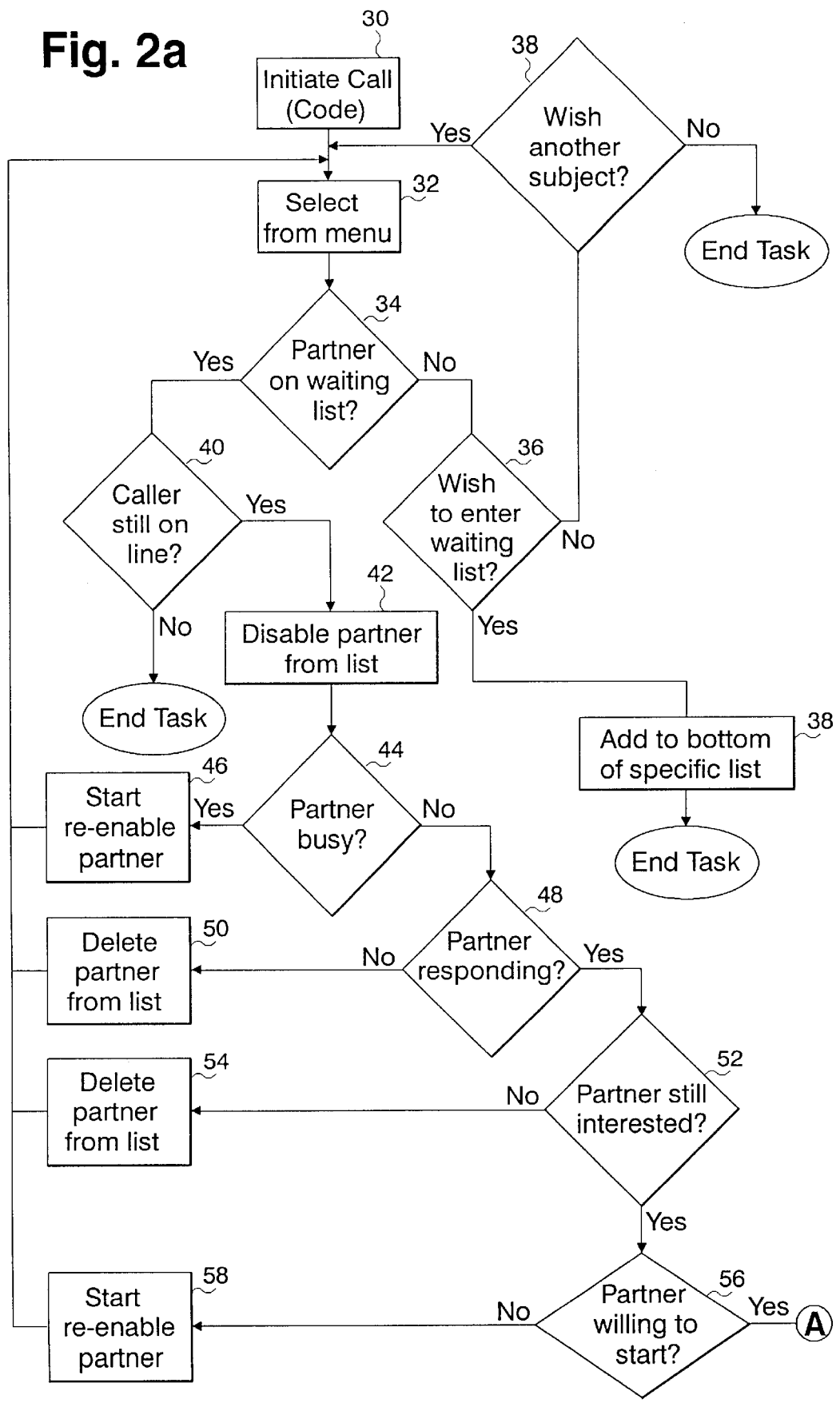
FIGS. 2a and 2b are flowcharts illustrating one method of initiating conversations between callers according to the invention.
Figure 2B:
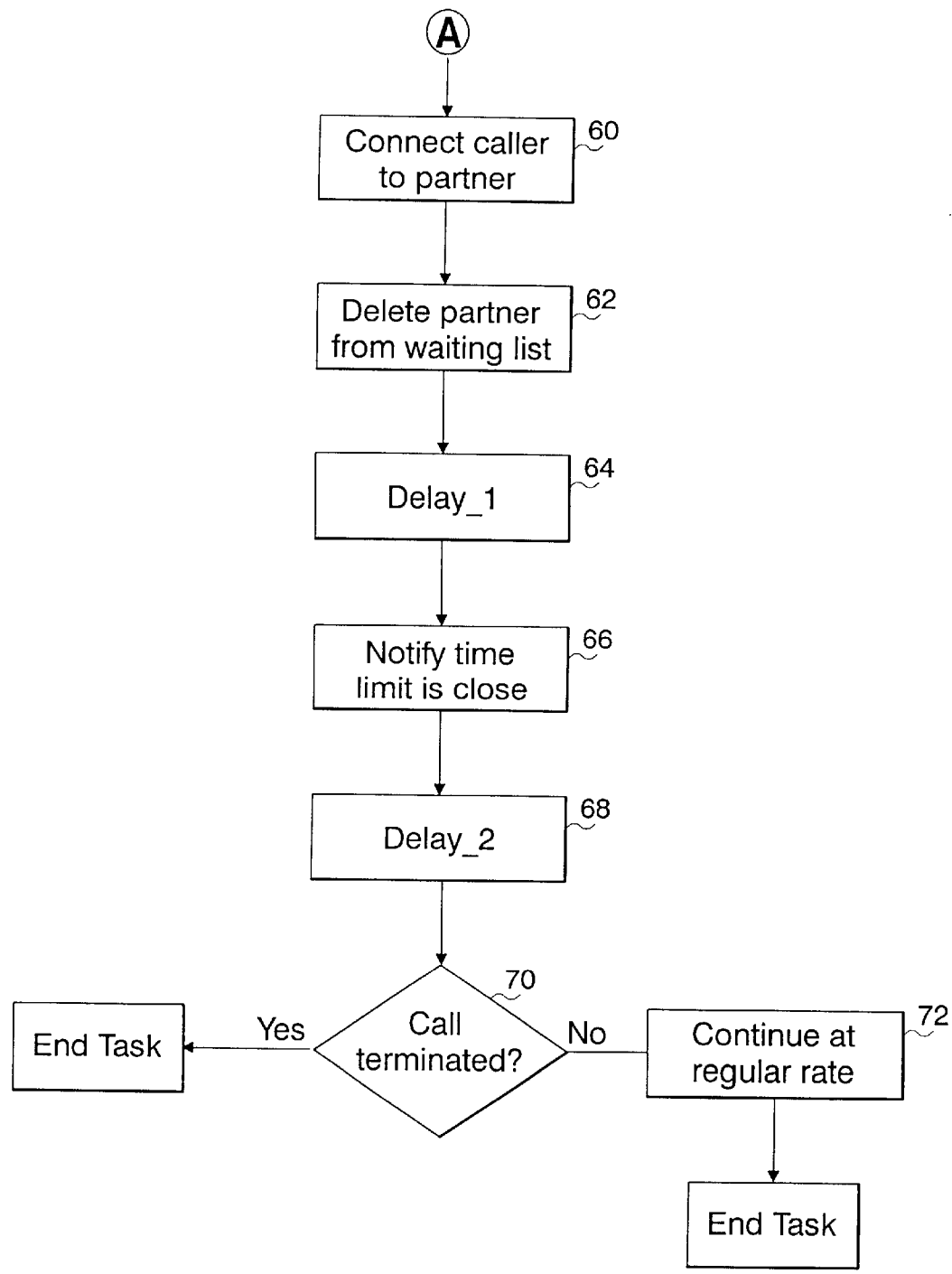

Turning now to the flowcharts in FIGS. 2a and 2b, a preferred implementation of the method is described in more detail. First, the system receives an initiated call (step 30). When a call is initiated, the caller may be asked to enter a user ID or other predefined code. A menu of topics for conversation is presented to the caller and the system waits to receive one or more topic selections if they have not been previously specified, such as in a stored profile for the user. (Step 32). If a profile system is used, the profile preferably can be easily modified by the caller. To simplify the profile generation process, a selection of predefined profiles can also be provided to address general user characteristics, such as age, common interests, gender, etc. After receiving the user's selection, the system compares the selection with those made by prior callers who are awaiting a conversation and identifies a suitable partner for the new caller from a waiting list of prior callers waiting for a conversation. (Step 34).

In operation, a wide range of topics can be made available for selection. Preferably, the topic categories are not too specific to avoid fragmenting the pool of callers into groups too small to quickly pair callers with each other. In addition, and as used herein, the term "topic" is not limited to a specific category of conversation, but also encompasses more nondescript selections such as general conversation and even a "don't care" or random selection.

The topic menu can be presented to the caller vocally or on a visual display associated with the calling device. The caller can be permitted to select multiple topics of conversation and prioritize them in order of interest. In addition, the system can maintain a record of the topics ultimately selected by the specific caller, and possibly other callers, and adjust the order in which topic selections are presented accordingly to, for example, put the most popular topics first.

Various selection techniques known to those of skill in the art can be used to partner callers with each other and the specific technique used is not critical to the operation of the invention. Preferably, selection is made according to the conversation topics selected by the various callers. In addition, or alternatively, the system can make selection decisions based on other factors, singly or in combination, such as the general geographic location of the various parties, the callers age, sex, language, or other criteria. In addition, the priority in matching a partner to an applicant (i.e. the priority within the waiting lists) can be set by the service provider according to various criteria, such as "first-come first serve", can be limited by system saturation considerations, and can be changed dynamically in response to various system conditions. In a most preferred embodiment, the selection process considers whether various parties have been previously partnered and ensures that the same two parties are not connected to each other for at least a minimum time span after their prior connection.

If a suitable partner cannot be found, the new caller can be given the option to enter a waiting list. (Step 36) If the new caller agrees, the caller's information is added to the list. (Step 38). Alternatively or in addition, the caller can be prompted to select a different topic for conversation (step 38) and the topic selection and partnering process repeated. To aid in this process, the system can also provide the caller with information about the topics selected by prior callers on the waiting list to help identify topics where partners are available for conversation.

A wait-listed caller can remain connected to the system until they are paired with another caller. During this time, the caller can be presented with advertisements or content of interest related to the selected topics. However, it is not required for the caller to maintain the connection. Instead, and according to a further aspect of the invention, the system can store access information, such as the caller's telephone number, and allow the caller to terminate the connection to the system after being placed on a waiting list. When the caller is subsequently paired, the communication link can be reestablished by the system. In one embodiment, the caller can specify a maximum time limit to remain on the waiting list after which their entry is purged.

Assuming that a suitable partner is available for the new caller, the system first ensures that the new caller is still connected to the system. At this point, the new caller can be automatically connected to the selected partner. The partnered prior caller is removed from the waiting list or the caller's entry is marked as being unavailable to thereby prevent the selected partner from being matched to additional new callers. (Step 42) In a preferred implementation, however, prior to connecting the paired callers, the system first determines whether the selected partner is able and willing to engage in the conversation.

In a call-back implementation, the system determines whether the selected partner is busy, e.g., whether they are using their telephone for another call. (Step 44). If a system implementing the present method is integrated within a telephone network, this determination can be made fairly easily. For a third-party implementation, the system may need to specifically initiate a new telephone call to the selected party and determine if the dialed phone number is busy or rings (provided, of course, that the selected partner is not still connected to the system). If the selected partner's phone is busy, the busy partner entry is re-enabled on the waiting list (step 46) and the system returns to the selection process. A delay code or timestamp can be associated with the wait-list entry for the busy partner to inform the selection system that the partner was busy and thereby avoid rapid selection of the same partner and repeated re-dialing or other unproductive system loops.

If the selected partner is available for communication, the system determines if the selected partner is responding. (Step 48). If there is no response, e.g., that partner has forgotten about the call or is not answering a callback ring, then the specific partner is deleted from the waiting list (step 50) and the selection process repeats. If the selected partner is available, they can also be asked if they are still interested in talking about the specific subject. (Step 52). If not, their entry is removed from the waiting list (step 54) and the selection process repeats.

In addition, the system can also determine whether the selected partner is available to talk immediately. (Step 56) Unlike a busy or non-responsive condition, there may be other temporary conditions which would prevent a caller that is still interested in a conversation from starting the conversation immediately. If the selected partner is still interested in conversing but cannot do so immediately, the selected partner is re-enabled on the waiting list (step 58) and the selection process repeats. As with a busy selection, a flag or other indicator can be associated with the temporarily unwilling partner to prevent them from being selected again for a period of time. Provided that the selected partner is ready, willing, and able, a communication link is initiated between the new caller and the prior caller that has been associated with the new caller. (Step 60) The link can be established using conventional switching and other telephonic techniques.

Once the connection between the parties has been established, the selected partner is removed from the waiting list. (Step 62). The fact of the partnering between the two parties can also be added to a historical record. This information is usable by the selection routine to prevent the same parties from being partnered with each other for at least a minimum time span.

While the parties are conversing, the time of the connection is monitored. During an initial predetermined period of time, the call can be permitted to proceed at a first billing rate. This rate can be set in advance or determined based on local system conditions, such as the amount of excess capacity presently available. After a first delay period which is less than the predetermined period of time, the callers are notified that the first rate period is about to expire. (Step 66) After a second delay period has elapsed (step 68), which second period is the remainder of the predetermined time period, the call is billed at a second rate. (Steps 70, 72).

A conversation is terminated when one or both parties hang up. In addition, each party can be given the option to terminate a conversation by dialing a special code. When a conversation is terminated, each party remaining connected to the system can be notified that the conversation was terminated and given the option to return to the main menu or request another partner from the same topic as the terminated conversation.

As will be appreciated, the present system and method provides a way to match partners who otherwise would not talk to each other and thereby increases the usage of the communication system as a result of the service and due to subsequent regular conversations which may result from the new acquaintances. For cellular service subscribers, the system provides the extra benefit of offering users an entertaining way to make use of the time during long journey. In addition, the system is also a useful service for business travelers or tourists away from home who would like to engage in safe conversations with people in the city they are visiting but do not know anyone. The availability of this service can also be used to encourage rentals of cellular telephones to such travelers.

In general, the service charges associated with use of this system can be be significantly lower than the regular usage fees (or even free of charge), because use of the system can be limited to only those resources which are not presently required by higher paying customers. By preventing paired callers from being re-partnered with each other, the ability of callers to misuse the reduce rate to engage in regular conversations is essentially eliminated. Various billing strategies can be used with the present system. For example, a caller can pay a fixed monthly subscription fee and received unlimited usage or the system or pay on a per-usage basis. Priority memberships can also be offered wherein a user will be given priority on waiting lists for the various topics.

While the invention has been particularly shown and described with reference to preferred embodiments thereof, it will be understood by those skilled in the art that various changes in form and details may be made therein without departing from the spirit and scope of the invention. For example, the system has been discussed above relative to two-party conversations. If a party line or conference calling system is available, wherein more than two callers can be connected to each other, the selection and switching routines can be easily modified to permit more than two callers to be partnered with each other. Other variations in implementation can also be made while still encompassing the general invention.

What is claimed is:

1. A method for initiating conversations between various callers to a communications service comprising the steps of:
    receiving a telephone call to the communications service from a new caller;
    receiving a selection from the new caller of at least one topic;
    associating the new caller with a prior caller in accordance with the new caller's selected topic;
    initiating a telephonic communication link between the new caller and the associated prior caller within the communication service,
    charging at least one of the new caller and the prior caller for the conversation at a first billing rate during a predetermined period of time; and
    charging at least one of the new caller and the prior caller for the conversation at a second billing rate after the predetermined period of time has elapsed.

2. The method of claim 1, wherein the step of receiving a selection comprises receiving a caller identifier and accessing a user profile associated with that identifier.

3. A method as in claim 2, wherein the new caller does not know the prior caller.

4. A method as in claim 2, wherein the prior caller does not know the new caller.

5. A method as in claim 2, wherein the initiating step further comprises:
    (a) determining if the prior caller is busy; and
    (b) determining if the prior caller is available.

6. A method as in claim 2, wherein the receiving a selection step from the new user occurs only after the receiving a call step.

7. A method as in claim 6, wherein the communications service never received a call from the new caller prior to the receiving a call step.

8. The method of claim 1, wherein the step of associating comprises:
    selecting the prior caller from a caller waiting list identifying a plurality of prior callers and topics selected by the respective prior callers; and
    removing the selected caller from the caller waiting list.

9. The method of claim 8, further comprising the step of:
    if no prior caller in the caller waiting list can be associated with the new caller, adding the new caller to the waiting list.

10. The method of claim 8, further comprising the steps of:
    determining if a communication link can be initiated with the selected prior caller; and
    if a communication link cannot be initiated with the selected prior caller, repeating the associating step to associate the new caller with a different prior caller.

11. The method of claim 10, wherein the determining step comprises at least one of (a) determining if the selected prior caller is busy, (b) determining if the prior caller is available for selection, and (c) determining if the prior caller is willing to be associated with the new caller.

12. The method of claim 1, wherein the first billing rate is zero.

13. The method of claim 1, further comprising the step of:
    providing notice to the new caller and the prior caller before the predetermined period of time has elapsed that the second billing rate will apply after the predetermined period of time has elapsed.

14. The method of claim 1, wherein the step of associating comprises ensuring that the new caller and the prior caller have not previously been associated with each other within at least a predetermined time span.

15. The method of claim 1, further comprising the step of determining a geographic location associated with the new caller;
    the new caller and the prior caller being associated in further accordance with the determined geographic location.

16. A method for initiating conversations between various callers to a communications service comprising the steps of:
    receiving a call to the communications service from a new caller;
    associating the new caller with a prior caller in accordance with predetermined criteria;
    initiating a communication link within the same communications service
    between the new caller and the associated prior caller;
    charging at least one of the new caller and the prior caller for the conversation at a first billing rate during a predetermined period of time; and
    charging at least one of the new caller and the prior caller for the conversation at a second billing rate after the predetermined period of time.

17. The method of claim 16, further comprising the step of preventing the new caller from being associated with the prior caller during a subsequent call to the communication service from the new caller for at least a predetermined time span.

18. The method of claim 16, wherein the predetermined criteria comprises at least one of a selected topic, a geographical area, age, sex, language, and a random factor.

19. The method of claim 16, wherein the first billing rate is zero.

20. A method as in claim 16, wherein the initiating step further comprises:
    (a) determining if the prior caller is busy; and
    (b) determining if the prior caller is available.

21. A method as in claim 16, wherein the new caller in the receiving step is new to the communications service.

22. A method for initiating telephone conversations between various callers to a communications service comprising the steps of:
    receiving a telephone call to the communications service from a new caller;
    pairing a prior caller with the new caller, the prior caller selected according to predefined criteria from a set of prior callers which were not previously paired with the new caller;
    initiating a telephonic communication link between the new caller and the identified prior caller
    charging at least one of the new caller and the prior caller for the conversation at a first billing rate during a predetermined period of time; and
    charging at least one of the new caller and the prior caller for the conversation at a second billing rate after the predetermined period of time has elapsed.

23. The method of claim 22, wherein the predefined criteria includes least one of a selected topic, a geographical area, age, sex, language, and a random factor.

24. The method of claim 22, wherein the first billing rate is zero.

25. A method as in claim 22, wherein the predetermined criteria comprises that the prior caller is selected from the set of prior callers which were previously not paired with the new caller within at least a predetermined prior time span.

26. A method as in claim 22, wherein the initiating step further comprises:

(a) determining if the prior caller is busy; and (b) determining if the prior caller is available.

27. A method as in claim 22, wherein the new caller in the receiving step is new to the communications service.

28. A system for initiating conversations between various callers to a communications service via a telephone network comprising:

a central switching system connected to the telephone network and being controlled by a programmed computer system;

the computer system configured to:

receive a telephone call to the communications service from a new caller;

receive a selection from the new caller of at least one topic;

associate the new caller with a prior caller in accordance with the new caller's selected topic;

initiate a telephonic communication link between the new caller and the associated prior caller wherein the computer is programmed to charge at least one of the new caller and the prior caller for the conversation at a first billing rate during a predetermined period of time and charge at least one of the new caller and the prior caller for the conversation at a second billing rate after the predetermined period of time has elapsed.

29. The system of claim 28, further comprising a user profile database, the computer system being programmed to receive a topic selection by receiving a caller ID and accessing a user profile associated with that caller ID.

30. The system of claim 28, wherein the computer is programmed to associate the new caller with a prior caller by selecting the prior caller from a caller waiting list identifying a plurality of prior callers and topics selected by the respective prior callers and subsequently removing the selected caller from the caller waiting list.

31. The system of claim 30 wherein the computer is further programmed to, add the new caller to the waiting list if no prior caller in the caller waiting list can be associated with the new caller.

32. The system of claim 30, wherein the computer is further programmed to determine if a communication link can be initiated with the selected prior caller and, if a communication link cannot be initiated with the selected prior caller, attempting to associate the new caller with a different prior caller.

33. The system of claim 28, wherein the computer is programmed to prevent the new caller from being associated with a specific prior caller if that the new caller was previously associated with that specific prior caller within at least a predetermined time span.

34. The system of claim 28, wherein the computer is programmed to charge at least one of the new caller and the prior caller for the conversation at a first billing rate during a predetermined period of time and charge at least one of the new caller and the prior caller for the conversation at a second billing rate after the predetermined period of time has elapsed.

35. The system of claim 34, wherein the first billing rate is zero.

36. A system as in claim 28, wherein the computer system is further configured to:

(a) determine if the prior caller is busy; and (b) determine if the prior caller is available.

37. A method as in claim 28, wherein the computer system is configured to receive call from the new caller, the new caller new to the communications service.

* * * * *

UNITED STATES PATENT AND TRADEMARK OFFICE
CERTIFICATE OF CORRECTION

PATENT NO. : 6,504,920 B1
DATED : January 7, 2003
INVENTOR(S) : Reuven Tal et al.

It is certified that error appears in the above-identified patent and that said Letters Patent is hereby corrected as shown below:

<u>Title page,</u>
Item [60], Related U.S. Application Data, delete "June 18, 1979" and substitute -- June 18, 1999 --

Signed and Sealed this

Eighth Day of July, 2003

JAMES E. ROGAN
*Director of the United States Patent and Trademark Office*